June 28, 1949.  B. E. MUSTEE  2,474,401
FLUID HEATER
Filed Oct. 29, 1947  2 Sheets-Sheet 1

INVENTOR.
BERNARD E. MUSTEE

Patented June 28, 1949

2,474,401

UNITED STATES PATENT OFFICE 2,474,401

FLUID HEATER

Bernard E. Mustee, Cleveland, Ohio, assignor to E. L. Mustee and Sons, Inc., a corporation of Ohio Application October 29, 1947, Serial No. 782,771

1 Claim. (Cl. 122—250)

This invention relates in general to hot water systems, and more particularly to thermostatic control of hot water heaters.

An object of this invention is to provide a heater system wherein the temperature responsive member is immersed in the stream of fluid being heated.

Another object of this invention is to provide a self-contained heater system adapted to respond to the temperature of fluid entering the system, and thereby apply a controlled intensity of heat to the fluid.

A still further object of this invention is to provide a complete heater and thermostatic control system requiring only fluid conduit attachments to a water tank and heat energy connections to completely install the system with the tank to maintain the fluid in the tank at a preselected temperature.

A still further object of this invention is to place the temperature responsive device in the stream of fluid within the heating area, in order that the heat may be turned off in the event that a stoppage of fluid flow causes the temperature within the coil to become excessive.

Figure 1:
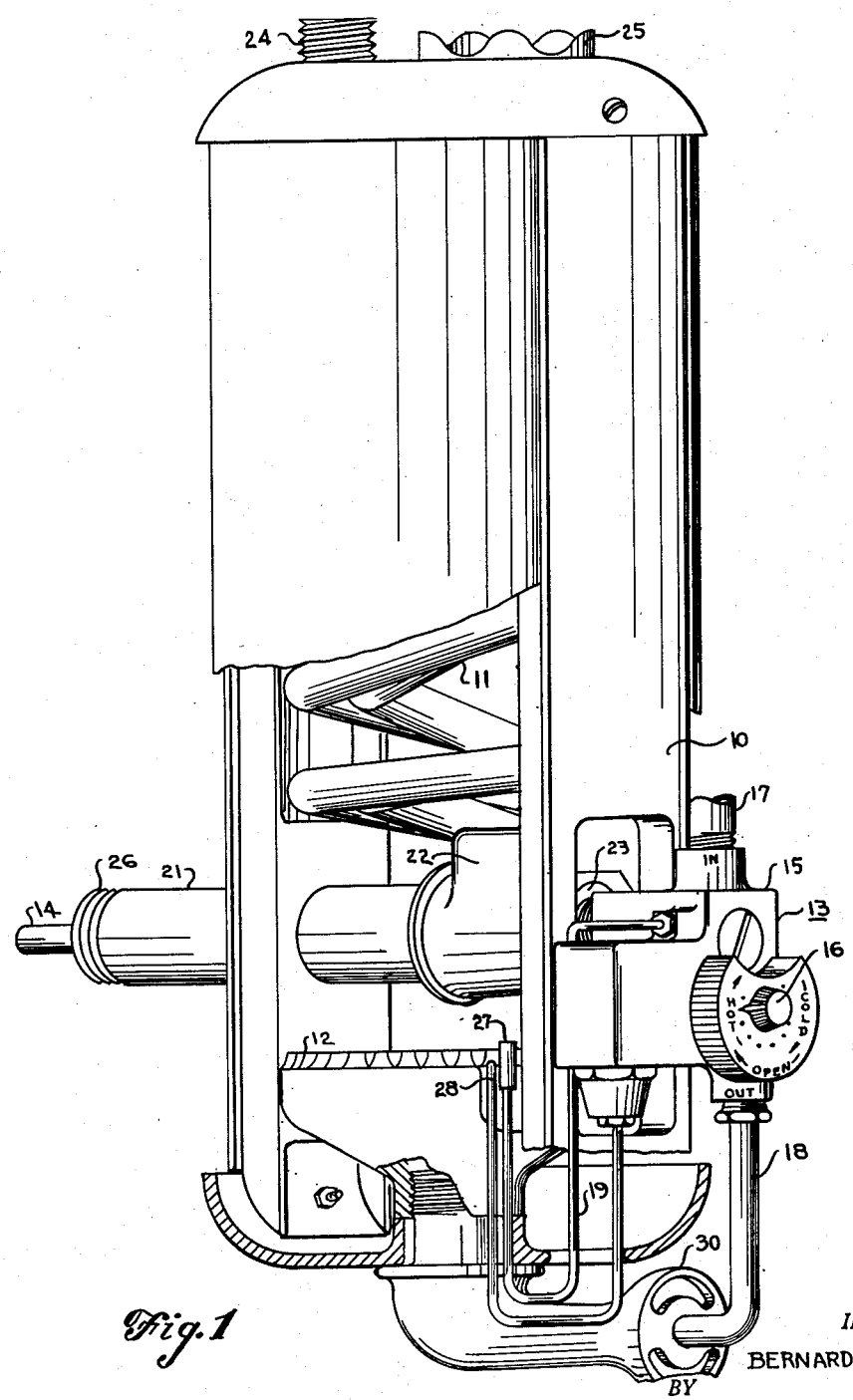
Figure 2:
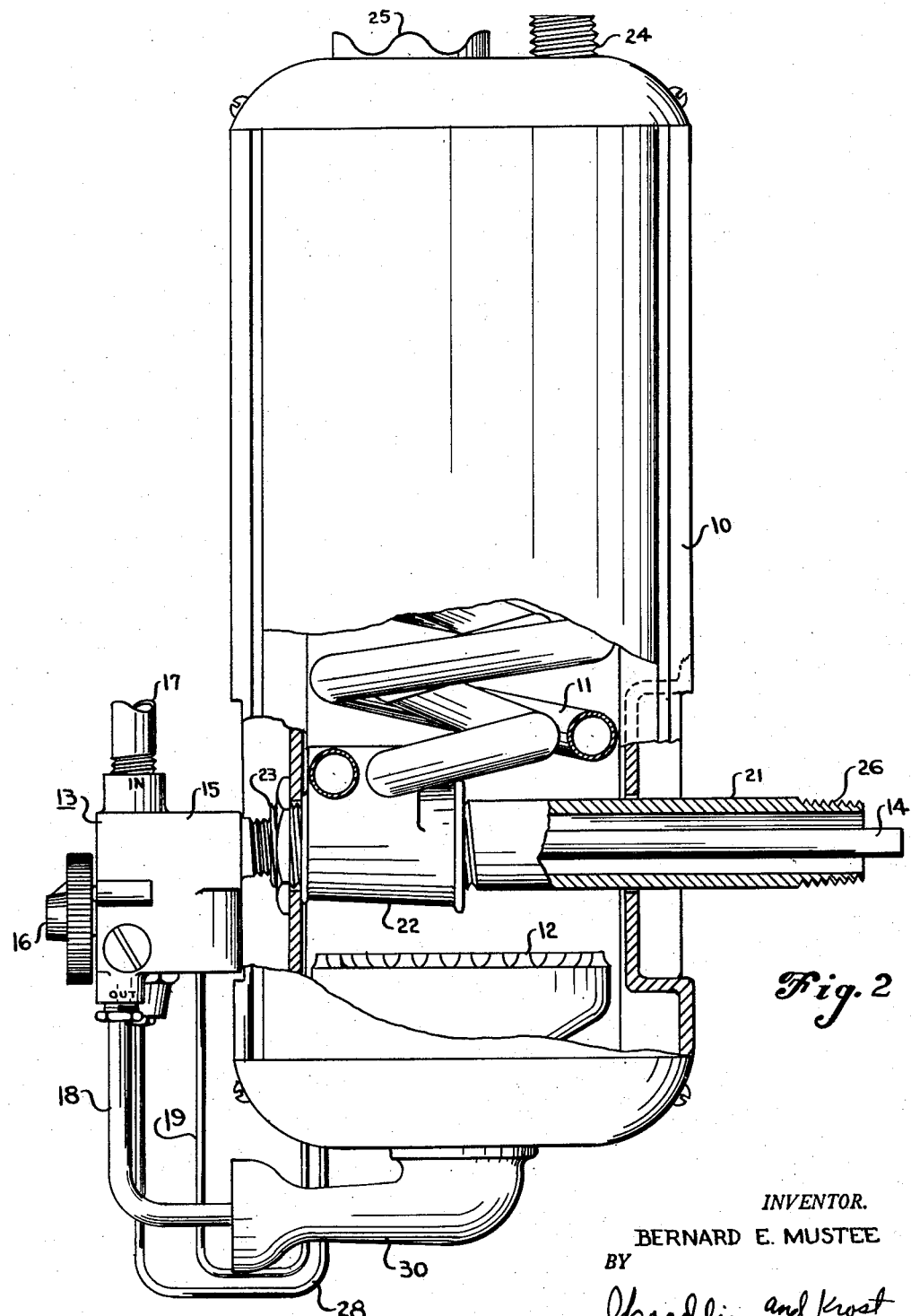

Other objects and a fuller understanding of my invention may be had by referring to the following description and claims, taken in conjunction with the accompanying drawing, in which:

Figure 1 is a 45° view of a heater coil and jacket employing a thermostatic control according to the principles of this invention; and Figure 2 is a side view of a heater coil and jacket with portions of the jacket broken away to illustrate the provision of this invention.

Fluid heaters, such for example as hot water heaters for domestic use, have been in use in various forms for a considerable period of time. These heaters are generally external of the storage tank, and comprise a coil having conduits to and from the tank, and a source of heat, such for example as a gas flame, below the coil. More recently, thermostatic control has been developed to turn the source of heat on or off in accordance with the temperature within the storage tank. Generally, this thermostatic control includes a thermostat located on the side of the storage tank and extending into the fluid within the tank. The location of the thermostat is usually on the side of the tank opposite the location of the heating coils and burner. Gas lines are extended around the storage tank to the burner element from the thermostatic control. This arrangement, of course, has required the installation of the heater unit, the separate installation of the thermostatic control unit, and the installation of gas conducting tubings from the thermostatic control to the burner unit around or beneath the storage tank. Such an installation is an individual installation job for each unit. Furthermore, all gas connections to and from the thermostat and the heater unit are subject to the variable conditions prevailing at the site of installation. In many instances, when parts are not brought along to the installation job, or some part or parts inadvertently are misconstructed and therefore do not fit properly, improvisions are made on the job, and these improvisions usually result in inferior and sometimes dangerous heating systems.

The heater and control system illustrated in the accompanying drawing provide a compact single unit assembly which may be put together at the factory and installed with a water tank simply by attaching the usual fluid conduit and heat supply lines.

In the drawings, a heater housing 10 is illustrated, and is provided with a coil 11. The housing 10 is of a modern improved type, and the coil 11 is of a double-coil type which has proven very efficient in service, but this housing and coil, along with the other related structure pertaining to the operation of heating the fluid in the coil 11, may be of any suitable design. This invention deals with the control of the application of thermal energy to the coil 11, and not with the construction of the coil, the burner, or the housing. In the heater illustrated, a burner 12 adapted to burn natural or artificial gas is illustrated. In this instance, again, the illustration of gas heat is only for the purpose of setting forth the environment of the invention, and may readily be replaced with oil, electricity, or any other suitable heating means.

In this invention, an intake conduit 21 extends in a transverse direction relative to the housing 10 and the general direction in which the coil 11 extends. The conduit 21 is provided with a threaded end 26 thereon which may be connected directly into a storage tank, or may be connected into an extension conduit. A coil header 22 serves as a portion of the complete conduit directing a stream of fluid into the coil 11. The header 22 is provided with suitable tubing connections to place the coil 11 in fluid communication with the conduit 21. In the Figure 2 of the drawings, one of the tubes of the coil 11 has been broken away to illustrate the opening into the coil header 22. The type of thermostat control 13 chosen to be illustrated in the drawings, includes an expansible member 14 and a valve 15 operable by longitudinal expansion and contraction of the expansible member 14. The expansible member 14 is inserted longitudinally within the intake conduit 21, and the valve 15 is joined to the end of the intake conduit 21 by a watertight thread engagement as illustrated by the reference character 23. Thus, the thermostat control 13 provides a gas control valve 15 externally of the fluid stream, and a temperature responsive member to operate the valve 15 positioned within the fluid stream. Furthermore, the temperature responsive member is positioned to be responsive to the actual temperature of fluid entering the heater system, rather than being positioned to be responsive to a temperature within an unrelated portion of the storage tank. Thus, the intensity of heat applied to the coil 11 will be governed by the amount of heat required to raise the temperature of the fluid actually circulating through the coil 11.

The valve 15 and the expansible member 14 illustrated, operate in response to the temperature of the surroundings in which the expansible member 14 is placed to close off or open the supply of gas to the burner 12. Also, the valve 15 illustrated is adapted to control the supply of gas to a pilot valve for the burner 12. As best illustrated in Figure 1, a pilot 27 is supplied with fuel from the valve 15 by a pilot line 19. A pilot thermocouple 28 is positioned beside the pilot 27 and is connected to the valve 15. Therefore, if for any reason the pilot 27 goes out, the pilot thermocouple 28 will cool and close the supply of gas to the pilot 27.

The burner 12 is supplied with gaseous fuel from the valve 15 through the burner line 18, and air is admitted to the burner 12 by means of a mixer 30. Gas is supplied to the valve 15 through the gas line 17, and the temperature at which the valve 15 will respond to open and close the supply of gas through the burner line 18 may be manually preselected by operation of an adjusting knob 16. As provided in the usual heater, the exhaust gases from the burner 12 are directed over the coil 11 and exhaust from the heater housing 10 through a gas exhaust 25 to a convenient chimney. The heated fluid from the coil 11 likewise exhausts through an outlet conduit 24.

From the description of this invention and the figures of the drawings, it may readily be seen that this improved heater system is self-contained and may thereby be quickly and easily attached to a storage tank or to a fluid line. The control is responsive to the temperature of the fluid entering the system, and not to an independent temperature at an unrelated position in the storage tank. Furthermore, when factory assembled, this control and heating system may be rigorously tested to assure safety and serviceable assembly.

It is to be particularly stressed, that the location of the expansible member is in the heating area. Therefore, if for any reason the circulation of fluid is stopped, or the fluid is drained from the system, the heat will never become excessive. In the installations that employ a remotely located thermostat, the coil could be damaged beyond repair by excessive heat, and the temperature responsive member would remain cool.

The thermostat control 13, including valve 15 and expansible member 14, as previously stated, are secured to the header 22 at the juncture indicated by reference character 23. The control 13 may therefore be removed, and the conduit 21 will then be accessible for cleaning.

In heating systems prior to this invention, the conduit leading to the lower portion of the coil 11 is closed and inaccessible. It is an established fact that ordinary city or well water contains a large percentage of dissolved solids and gases. When this water is heated, some of those solids precipitate from solution. This precipitation takes place largely in the heat exchanger coil. For this reason, with prior devices, the heater assembly must be disassembled periodically and flushed out.

With the arrangement of parts as set forth in this invention, the conduit 21 is opened by removal of the thermostat control 13, and a brush may be inserted to clean out the precipitated matter. This operation is quickly and easily accomplished with a minimum of time and effort.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

Fluid heater means comprising, fuel combustion burner means, water-conducting coil means mounted above said burner means, an intake manifold including a conduit having an entrance end and a coil header end, said coil header end having coil attachment means securing said coil means in fluid-conducting relationship with said coil header end, said coil means defining a water-conducting path continuously spiraling downward to said intake manifold and providing a slide through which solid foreign matter can slide down into said intake manifold, said coil header end forming a longitudinal continuation of said conduit portion substantially along a longitudinal axis common to said conduit portion and said header end, said coil header end having an axial opening, fuel-flow control means removably closing said axial opening and having a temperature responsive member extending within said conduit portion, said fuel-flow control means being removable from said coil header end to permit a cleaning tool to be passed through said conduit from the axial opening.

BERNARD E. MUSTEE.

REFERENCES CITED

The following references are of record in the file of this patent:

UNITED STATES PATENTS

| Number | Name | Date |
|---|---|---|
| 624,903 | Borne et al. | May 16, 1899 |
| 861,565 | White | July 30, 1907 |
| 906,357 | Ziegler | Dec. 8, 1908 |
| 929,081 | Enterline | July 27, 1909 |
| 1,031,226 | Arnold et al. | July 2, 1912 |
| 1,194,398 | Langenheim | Aug. 15, 1916 |
| 1,312,724 | Fisher | Aug. 12, 1919 |
| 1,815,723 | Morrow | July 21, 1931 |
| 1,817,549 | Evans | Aug. 4, 1931 |
| 1,817,615 | Friedman | Aug. 4, 1931 |
| 1,839,392 | Humphrey | Jan. 5, 1932 |
| 1,868,186 | Ackron | July 19, 1932 |
| 2,003,579 | Conant | June 4, 1935 |
| 2,033,904 | Johnson et al. | Mar. 10, 1936 |
| 2,154,683 | Kerrick | Apr. 18, 1939 |
| 2,179,496 | Czeschin | Nov. 14, 1939 |
| 2,215,520 | Burklin | Sept. 24, 1940 |
| 2,290,637 | Dunham | July 21, 1942 |